(12) United States Patent
Englert

(10) Patent No.: US 6,561,239 B2
(45) Date of Patent: May 13, 2003

(54) MACHINE FOR MACHINING WORKPIECES OF WOOD, PLASTIC AND THE LIKE, IN PARTICULAR, A MOLDING MACHINE, AND A METHOD FOR ADJUSTING SUCH A MACHINE

(75) Inventor: Heinrich Englert, Lauda-Königshofen (DE)

(73) Assignee: Michael Weinig Aktiengesellschaft, Tauberbischofsheim (DE)

( * ) Notice: Subject to any disclaimer, the term of this patent is extended or adjusted under 35 U.S.C. 154(b) by 0 days.

(21) Appl. No.: 09/794,893

(22) Filed: Feb. 26, 2001

(65) Prior Publication Data

US 2001/0017169 A1 Aug. 30, 2001

(30) Foreign Application Priority Data

Feb. 26, 2000 (DE) .......................................... 100 09 155

(51) Int. Cl.⁷ ...................... B23Q 15/00; B27B 31/00; B27C 1/12
(52) U.S. Cl. ................. 144/404; 144/114.1; 144/117.1; 144/246.1; 144/248.4; 144/250.18; 144/250.26; 144/357; 198/782; 409/194; 700/167
(58) Field of Search ................................. 198/780, 782; 700/159, 160, 167; 409/194, 218; 144/114.1, 116, 117.1, 242.1, 246.1, 248.4, 250.12, 250.18, 250.26, 356, 357, 382, 402, 404

(56) References Cited

U.S. PATENT DOCUMENTS 2,102,186 A * 12/1937 Nicholson et al. ........ 144/114.1

| 4,457,350 | A | * | 7/1984 | Finnila | .................... | 144/117.1 |
| 5,007,469 | A | * | 4/1991 | Englert et al. | ......... | 144/250.12 |
| 5,477,899 | A | * | 12/1995 | Schmitt | ................ | 144/250.12 |
| 6,247,511 | B1 | * | 6/2001 | Maeda et al. | ............ | 144/242.1 |

FOREIGN PATENT DOCUMENTS

| DE | 94 14 904 | 12/1994 |
| DE | 197 56 503 | 6/1999 |

OTHER PUBLICATIONS

IMA Quadro: das Werkstatt–Zentrum 2 Maschinen + 1 Mann = Montagefertige Möbel (company brochure, Nov. 1991, Germany).

* cited by examiner

Primary Examiner—W. Donald Bray
(74) Attorney, Agent, or Firm—Gudrun E. Huckett

(57) ABSTRACT

A machine for machining workpieces of wood and plastic has a transport path for transporting workpieces through the machine. One or more driven spindles having a tool for machining the workpieces transported through the machine are provided. An adjustable element that is adjustable relative to the tool is provided. At least one data storage is provided for storing data at least of the tool wherein the data are used to determine a position of the adjustable element relative to the tool and are retrievable. In the method for adjusting the machine, characteristic data of the tool are measured and stored in the data storage. The characteristic data are supplied to a control unit. In the control unit positioning data for the adjustable element are calculated based on the characteristic data and then made available for processing the workpieces.

48 Claims, 8 Drawing Sheets

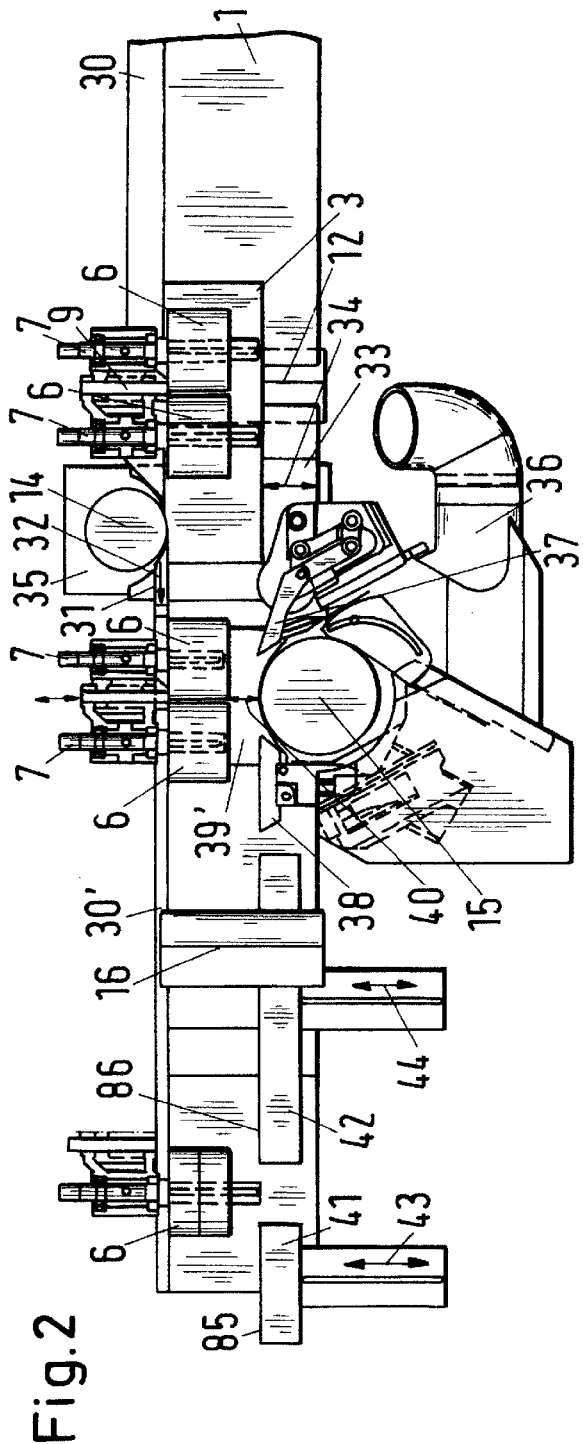
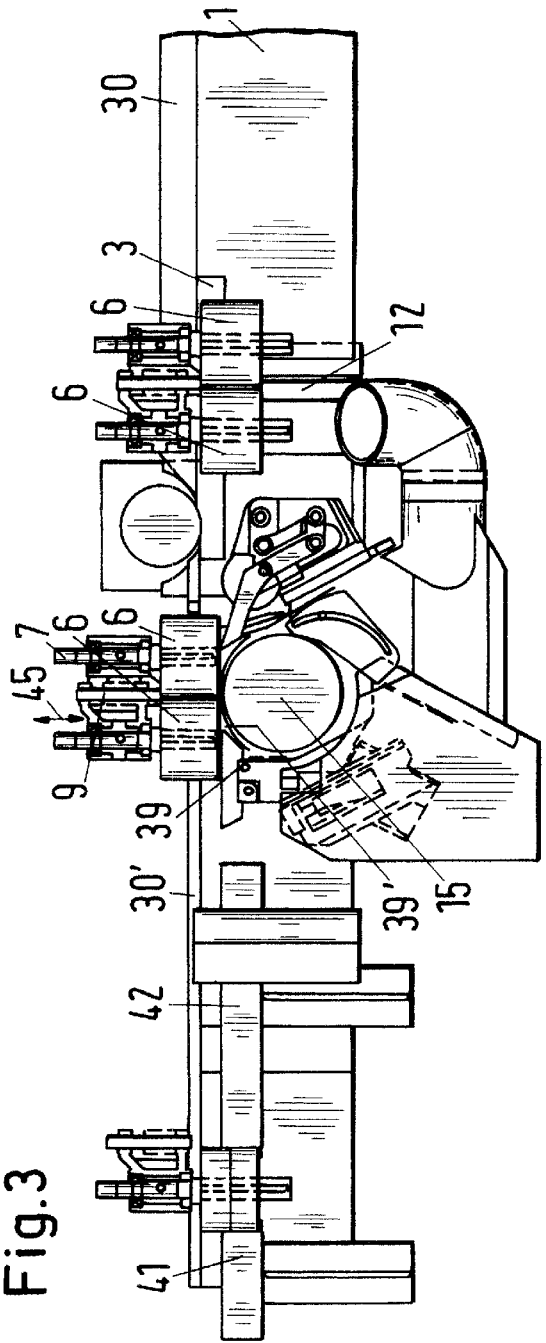

MACHINE FOR MACHINING WORKPIECES OF WOOD, PLASTIC AND THE LIKE, IN PARTICULAR, A MOLDING MACHINE, AND A METHOD FOR ADJUSTING SUCH A MACHINE

BACKGROUND OF THE INVENTION

1. Field of the Invention

The invention relates to a machine for machining workpieces of wood, plastic, and the like, in particular, a molding machine, comprising a transport path for the workpieces, at least one driven spindle on which a tool is seated, and further at least one adjustable element. The invention also relates to a method for adjusting such a machine.

2. Description of the Related Art

In known woodworking machines, in particular, molding machines, the adjustment or retooling for the purpose of machining different workpieces is a time-consuming and complex process. Accordingly, pressing elements, which are correlated with the tools, or stops and tabletops must be adjusted in addition to the tools themselves. For this purpose, first the tool is placed onto the spindle. Subsequently, the pressing elements, the stops, or the tabletops can be adjusted relative to this tool. Because of this process, the adjustment of the machine is time-consuming. Moreover, it is not ensured that, based on the adjustment, the workpiece to be machined by the tool will fulfill the required machining precision. Accordingly, it is conventional to run at least one workpiece in a preliminary run through the machine to compare the resulting profile of the workpiece with a nominal profile, and, in the case of deviations, to readjust the corresponding elements of the machine. In particular, the precise adjustment of the pressing elements relative to the tool is complex and time-consuming. After the preliminary run of the workpiece, the pressing elements must often be readjusted in order to obtain the desired high machining precision of the workpiece. The pressing elements are to be moved as closely as possible toward the workpiece in order to guide the workpiece during machining as precisely and stably as possible.

SUMMARY OF THE INVENTION

It is an object of the present invention to design the machine and the method of the aforementioned kind such that the adjustment and/or retooling on the machine can be performed within the shortest amount of time with high precision.

In accordance with the present invention, this is achieved in regard to the machine in that the machine has at least one data storage in which data at least of the tool are stored, which data are used to determine the position to be adjusted of the adjustable element relative to the tool, and that the data can be retrieved for positioning the adjustable element.

In accordance with the present invention, this is achieved in regard to the method in that the characteristic data of the tool are measured and stored in a data storage and that the data are supplied to a control unit which, under consideration of these data, calculates and makes available for further processing the position for the adjustable element.

In the machine according to the invention, characteristic data of the tool are measured external to the machine and are stored in a data storage. Based on the tool data stored in the data storage the adjustable element, such as pressing elements, pressing guides or rules etc., can be precisely positioned without the tool being seated in the machine. When adjusting the machine, the characteristic data of the tool are supplied to a control unit which, based on the tool data, calculates and makes available for further processing the required position of the corresponding adjustable element.

BRIEF DESCRIPTION OF THE DRAWING

In the drawing:

FIG. 2 is a plan view onto the machine according to FIG. 1, through which a wide workpiece is guided;

FIG. 3 is a plan view of the machine according to the invention in an illustration corresponding to FIG. 2, through which a narrow workpiece is guided;

DESCRIPTION OF THE PREFERRED EMBODIMENTS

Figure 1:
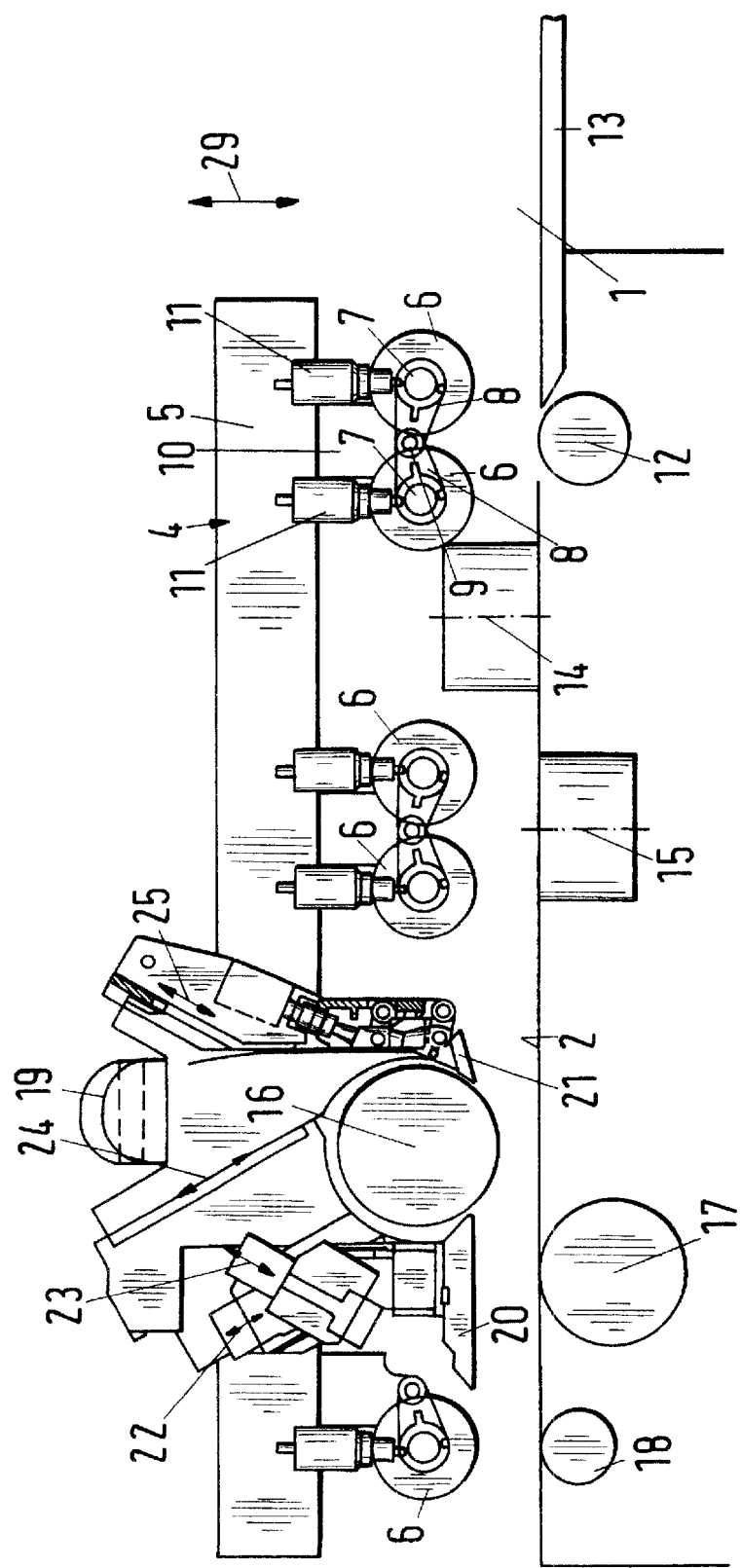
FIG. 1 is a schematic illustration of a side view of a machine according to the invention.

The machine according to the invention is a molding machine with which workpieces are profiled when passing through the machine. The workpieces are used, for example, for manufacturing window frames or door frames. The machine has a machine bed 1 on which the workpieces 3 to be machine are transported by means of at least one feeding unit 4 on the upper side 2 of the machine bed 1. The feeding unit 4 has a transport beam 5 which is positioned at a spacing above the machine bed 1 and which has feeding rollers 6 for transporting the workpieces 3 through the machine. The feeding rollers 6 are seated on horizontal shafts 7 which are supported on free ends of feeding pendulums 8. The feeding pendulums 8 are supported on a pendulum holder 10 pivotable about a parallel axle 9 positioned between them. The pendulum holder 10 is fastened to the transport beam 5. Pressure cylinders 11 engage the free ends of the feeding pendulums 8 and are supported on the transport beam 5. They force the feeding rollers 6 onto the workpiece 3 to be transported. The transport beam 5 can be adjusted in the vertical direction.

In the area below the feeding roller pair 6 shown in the right half of FIG. 1, a horizontal planing or dressing spindle 12 is provided. It has a planing table 13 arranged upstream thereof which can be adjusted in the vertical direction in order to adjust the cutting removal or cutting depth on the workpiece 3. The planing or dressing spindle 12 is rotatably supported in the machine bed 1. The two feeding rollers 6 are arranged in the area above the planing or dressing spindle 12 such that the shafts 7 of the feeding roller 6 are positioned on opposite sides of the axis of rotation of the planing spindle 12, when viewed in a plan view. In FIG. 1, for reasons of simplifying the drawing, the tool, with which the underside of the workpiece 3 is machined and which is seated on the planing spindle, is illustrated only schematically in the form of its cutting circle.

The feeding roller pair 6 shown to the right in FIG. 1 has arranged downstream thereof a vertical spindle 14 on which a tool, illustrated only schematically, is seated with which the right side of the workpiece 3 is machined when viewing the workpiece 3 in the transport direction.

In the transport direction of the workpieces 3 behind the right vertical spindle 14 a vertical spindle 15 is arranged on which a tool, schematically illustrated, is seated with which the left side of the workpiece 3, when viewed in the transport direction, is machined. At the level of this left spindle 15 a feeding roller pair 6, illustrated at the center of FIG. 1, is positioned.

In the feeding direction, at a spacing behind this central feeding roller pair 6, the machine is provided with an upper horizontal spindle 16. The tool seated thereon machines the upper side of the workpiece 3.

In the feeding direction of the workpiece 3, at a minimal spacing behind the upper spindle 16, a lower spindle 17 is provided in the machine bed 1 which has arranged with minimal spacing downstream thereof a table roller 18 supported in the machine bed. A tool, only schematically illustrated, is seated on the lower spindle 17 and machines the underside of the workpiece 3 when passing through the machine.

Figure 10:
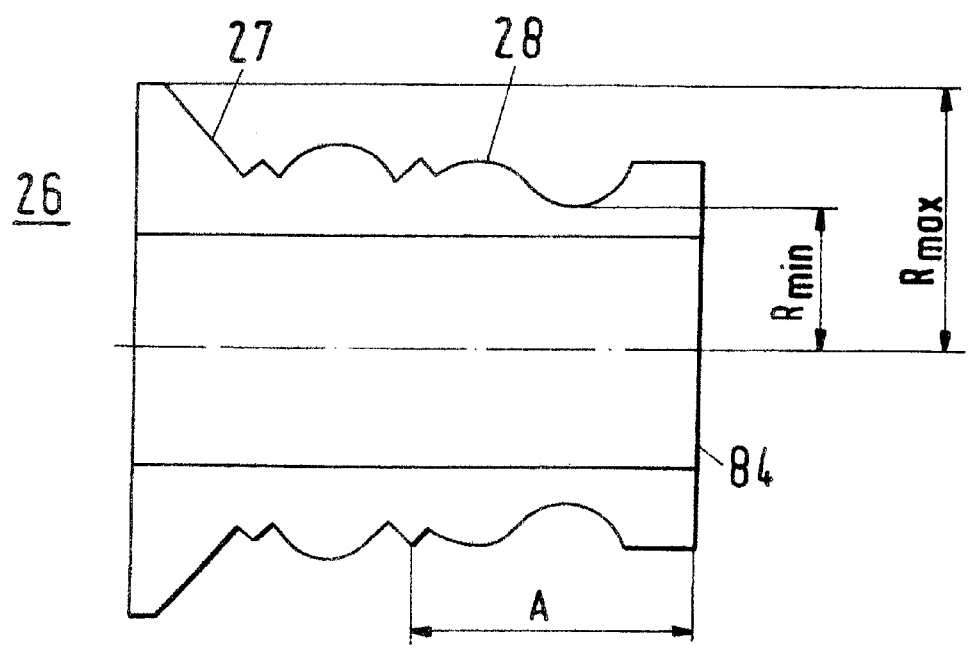
FIG. 10 shows a tool which is to be fastened on the spindles of the machine according to the invention.

The feeding roller 6 shown to the left in FIG. 1 is positioned with minimal spacing in the feeding direction of the workpieces 3 behind a suction hood 19 below which the spindle 16 is arranged. In the area of the suction hood 19 adjustable pressing elements 20 and 21 are provided which are arranged with minimal spacing before and behind the tool seated on the spindle 16 and rest against the upper side of the workpiece 3 when the workpiece 3 is fed through the machine. The corresponding adjusting device is known (German patent document 43 32 281 A1) so that it will be explained only briefly in the following. In FIG. 1, the corresponding adjusting devices 22 to 25 are illustrated schematically. By adjusting the pressing elements 20, 21 in these directions 22 to 25, an optimal adaptation of the position of the pressing elements relative to the tool seated on the spindle 16 is realized, i.e., the pressing elements are advanced as closely as possible toward the tool. FIG. 10 shows in an exemplary fashion a tool 26 to be fastened on the spindle 16 and provided with profiled blades 27. The blade profile 28 defines a maximum radius $R_{max}$ as well as a minimal radius $R_{min}$ of the tool 26. The maximum radius $R_{max}$ determines the maximum cutting circle radius, and the smallest radius $R_{min}$ determines the minimum cutting circle radius of the tool 26. The pressing elements 20, 21 (FIG. 1) are adjusted relative to the maximum radius $R_{max}$ and the minimum radius $R_{min}$ of the tool 26 seated on the spindle 16. It is also possible to adjust the pressing elements 20, 21 relative to the maximum radius $R_{max}$ and the fluting depth (groove depth) of the profile produced on the workpiece 3 by means of the profiled blade 27. The fluting depth (groove depth) is defined by $R_{max}-R_{min}$ In this case, the pressing elements 20, 21 are adjusted by adjustment in the direction 23 and 24 relative to the maximum radius $R_{max}$ and by adjustment in the direction 22 and 25 relative to the fluting depth ($R_{max}-R_{min}$).

The tool 26 which is illustrated as an example can be placed onto any suitable spindle of the machine.

The transport beam 5 of the feeding unit 4 can be adjusted also in the vertical direction 29, in order to adjust the feeding rollers 6 relative to the thickness of the workpiece 3 to be transported. However, it is also possible to adjust the transport beam 5 relative to the minimal cutting circle radius $R_{min}$ of the tool 26 which is seated in this case on the upper spindle 16 and relative to the workpiece thickness together with the upper spindle 16.

The unmachined workpieces 3 are guided into the machine (FIG. 2) along a stop rule or stop guide 30 against which the workpieces 3 rest with their right side. The stop rule or guide 30 is adjustable transversely to the feeding direction of the workpiece 3 for adjusting the cutting depth or cutting removal of the tool seated on the right spindle 14. The required cutting removal depends on the curvature and the oversize of the workpiece 3. The term oversize in this connection is to be understood as the ratio of the workpiece blank width to the finished workpiece width. In the area downstream of the right spindle 14 a stop guide or rule 30' is provided. In the feeding direction directly behind the right spindle 14 a stop 31 is positioned which is adjustable in the adjusting direction 32 relative to the tool seated on the right spindle 14. The adjusting direction 32 is positioned parallel to the feeding direction of the workpiece 3. The stop 31 is adjusted relative to the radii $R_{max}$ and $R_{min}$ of the tool seated on the spindle 14.

The right spindle 14 is located on a slide 35 which is adjustable in the direction of arrow 34 perpendicularly to the feeding direction of the workpiece 3. By moving the slide 35 in the adjusting direction 34, the right spindle 14 can be adjusted precisely relative to the workpiece 3 or the stop guide 30' as a function of the tool seated on the spindle 14.

A tabletop 33 is positioned on the slide 35 and is also adjustable in the direction of arrow 34. The tabletop 33 can also be adjusted relative to the slide 35 as well as the tool seated on the spindle 14 as a function of its maximum cutting circle radius $R_{max}$.

The right spindle 14 is positioned underneath a suction hood (not illustrated) with which the cuttings that are produced during machining of the workpiece 3 are removed. The left spindle 15 has also correlated therewith a suction hood 36. Upstream and downstream of the left spindle 15 viewed in the feeding direction, pressing elements 37 and 38 are provided which rests against the left side of the workpiece 3 when viewed in the feeding direction and, like the pressing elements 20, 21 of the upper spindle 16 (FIG. 1), can be adjusted relative to the tool seated on the spindle 15. The left spindle 15 is also supported on a slide 39 which is adjustable in the direction of arrow 40 perpendicularly to the feeding direction of the workpiece 3 in order to adjust the tool seated on the spindle 15 relative to the workpiece 3. A tabletop 39' is provided on the slide 39 which, like the tabletop 33, is also adjusted relative to the maximum radius $R_{max}$ of the respective tool.

In the feeding direction at a spacing behind the left spindle 37, two pressing rules or guides 41 and 42 are provided which are adjustable perpendicularly to the advancing direction of the workpiece 3 in the direction of arrows 43 and 44. Accordingly, the pressing guides 41, 42 can be adjusted relative to the width of the workpiece 3. The adjustment can also be realized relative to the minimal radius $R_{min}$ of the tool seated on the left spindle 15. The pressing guides 41, 42 can then be adjusted to the workpiece width together with the tool seated on the left spindle 15.

The feeding rollers 6 seated on the shafts 7 are adjusted such that they, in a plan view according to FIG. 2, rest in the direction of their width on the workpiece 3 whose width is, for example, larger than the width of the feeding rollers 6.

When advancing the workpiece 3 in the machine, first its underside is dressed with the tool seated on the planing or dressing spindle 12. The planing table 13 (FIG. 1) is adjusted relative to the desired cutting removal (cutting depth) relative to the tool seated on the planing spindle 12. Upon moving farther, the right side, in the feeding direction, is machined with the tool seated on the right spindle 14. The tool seated on the left spindle 15 machines the left side of the workpiece 3 when moving farther through the machine. The upper side of the workpiece 3 is subsequently machined by the tool seated on the upper spindle 16. By means of the tool seated on the lower spindle 17, the underside of the workpiece 3 is finally machined again.

FIG. 3 shows that also very narrow workpieces 3, whose width is substantially smaller than the width of the feeding rollers 6, can be processed in the machine. Because of the narrow width of the workpiece 3, the left spindle 15 and the pressing rules 41, 42 must be adjusted perpendicularly to the feeding direction in the direction toward the stop rule or guide 30. The slide 39 which supports the left spindle 15 is moved accordingly. In order to prevent a collision with the oppositely positioned feeding rollers 6, the rollers 6 are axially returned according to the workpiece width and the radius $R_{max}$ of the tool seated on the spindle 15. In a plan view according to FIG. 3, the feeding rollers 6 are positioned only with a portion of their width above to the transport path of the workpiece 3. The left spindle 15 with the suction hood 36 and the adjusting device for the pressing elements 37, 38 are arranged in the feeding direction of the workpiece 3 such that in the disclosed adjustment they will not collide with the feeding rollers 6 at the level of the planing spindle 12 and the neighboring stop rule 42. The central feeding rollers 6 are adjusted in the direction of arrow 45 perpendicularly to the feeding direction together with the shafts 7 and/or feeding pendulums 8 and the pendulum axle 9 and/or the pendulum holder 10.

As illustrated in FIGS. 2 and 3, the pressing elements 37, 38 of the left spindle can be adjusted in the same way as the pressing elements 20, 21 of the upper spindle 16. In this way, a simple adjustment of the pressing elements 37, 38 relative to the tool seated on the left spindle 15 is possible.

Figure 4:
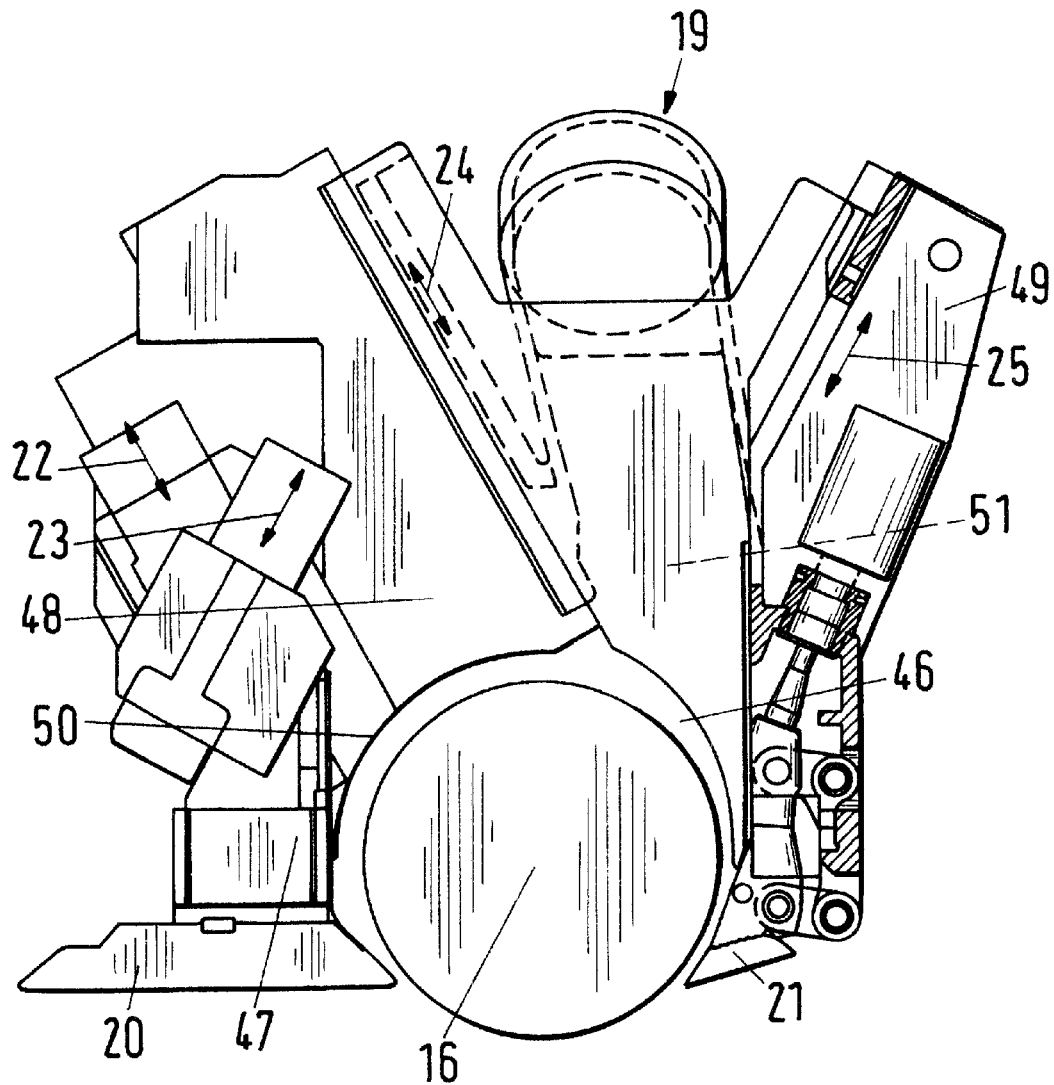
FIG. 4 shows on an enlarged scale an upper spindle on which a tool with a large diameter is seated.

FIG. 4 shows on an enlarged scale the upper spindle 16 which is positioned in a suction chamber 46 of the suction hood 19. The size of the suction chamber 46 is matched to the diameter of the tool seated on the spindle 16. This is achieved in that the walls of the suction chamber 46 are formed at least partially of the carriers 47 to 49 of the pressing elements 20, 21. The inner wall 50 of the suction chamber 46 extends approximately coaxially to the cutting circle diameter. The inner wall 50 has only a minimal spacing from the cutting circle diameter so that the cuttings, which are produced by machining the workpieces 3, can reach optimally a suction channel 51 of the suction hood 19.

Figure 5:
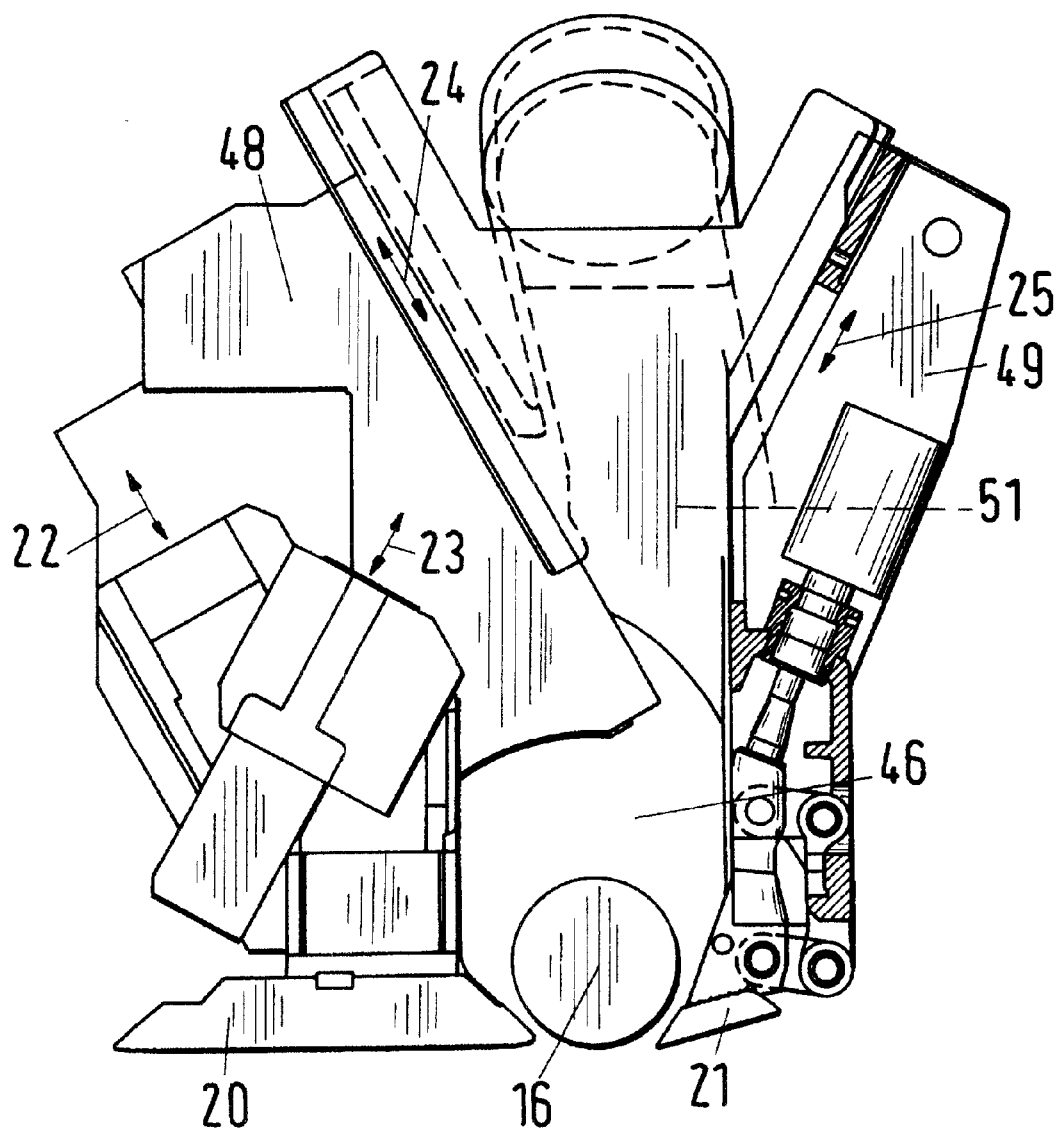
FIG. 5 shows the upper spindle according to FIG. 4 on which a tool with a small diameter is seated.

FIG. 5 shows the situation when the upper spindle 16 has a tool with a small cutting circle diameter seated thereon. According to this small cutting circle diameter, the pressing elements 20, 21 have been correspondingly adjusted. The carrier 49 for the pressing element 21 is moved downwardly in the direction of arrow 25. The suction hood 19 has been moved in the direction of arrow 24 and the carrier 47 in the direction of arrows 22 and 23. In this way, the size of the suction chamber 46 has been automatically decreased with the adjustment of the pressing elements 20, 21 and thus matched to the smaller tool on the spindle 16. The boundary of the suction chamber 46, which is formed by the inner walls of the carriers 47 to 49, is thus adjusted correspondingly when an adjustment of the pressing elements 20, 21 is carried so that an automatic volume adaptation of the suction chamber 46 is achieved. In this way, it is possible that the cuttings, produced by a tool having a smaller cutting circle diameter, can be optimally removed by suction into the suction channel 51. FIG. 5 shows as an example the situation when the tool seated on the spindle 16 has no fluting depth, i.e., the blades of this tool have a constant outer cutting diameter across their length. FIG. 4, on the other hand, shows the situation when the tool seated on the spindle 16 is a profiled blade with a fluting depth.

Figure 6:
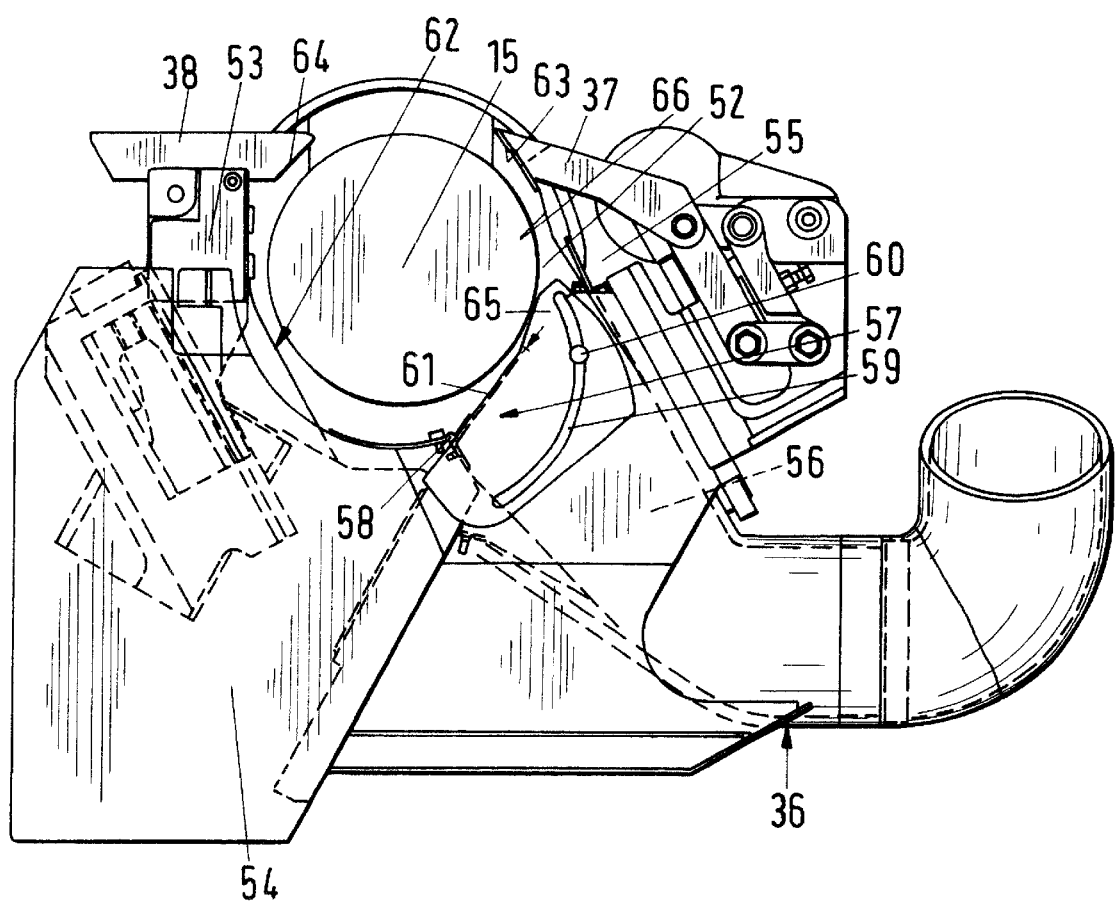
FIG. 6 shows on an enlarged scale a left spindle on which a tool with a large diameter is seated.

FIG. 6 shows in a plan view the left spindle 15 on which a tool with a large cutting circle diameter is seated. The tool seated on the left spindle 15 has in the described embodiment no profiled blade but a blade with straight cutting edge so that this blade does not have a profile depth. The tool or the spindle 15 is positioned in a suction chamber 52 of the suction width 36. The two pressing elements 37, 38 upstream and downstream of the spindle 15 are adjusted in the same way as the pressing elements 20, 21 of the upper spindle 16. In accordance with the suction hood 19, the suction chamber 52 is delimited by the carriers 53 to 55 of the pressing elements 37, 38. At the level of the suction channel 56 an adjusting element 57 is provided that is pivotable about an axis 58 extending parallel to the spindle axis. The adjusting element 57 has a curved slot 59 engaged by a guide element 60 which is provided on the suction hood 36. The adjusting element 57 has an end face 61 facing the spindle 15 and forming a part of the inner wall 62 of the suction chamber 52. As in the case of the suction hood 19, the suction chamber 52 is delimited also by the end faces 63 and 64 of the pressing elements 37, 38 facing the spindle 15. The suction channel 56 as well as the suction channel 51 adjoin tangentially the suction chamber 52. An inlet opening 65 extends between the end face 61 of the adjusting element 57 and the oppositely positioned inner wall portion 66. Accordingly, the inner wall 62 of the suction chamber 52 is matched approximately to the cutting circle diameter of the tools seated on the spindle 15. The inner wall 62 has only a minimal spacing from the cutting circle diameter. Accordingly, the cuttings which are produced during machining of the workpiece 3 are guided via the inlet opening 65 reliably into the suction channel 56. The end face 61 of the adjusting element 57 is formed by a cuttings guide plate which ensures that the cuttings are guided reliably to the inlet opening 65.

Figure 7:
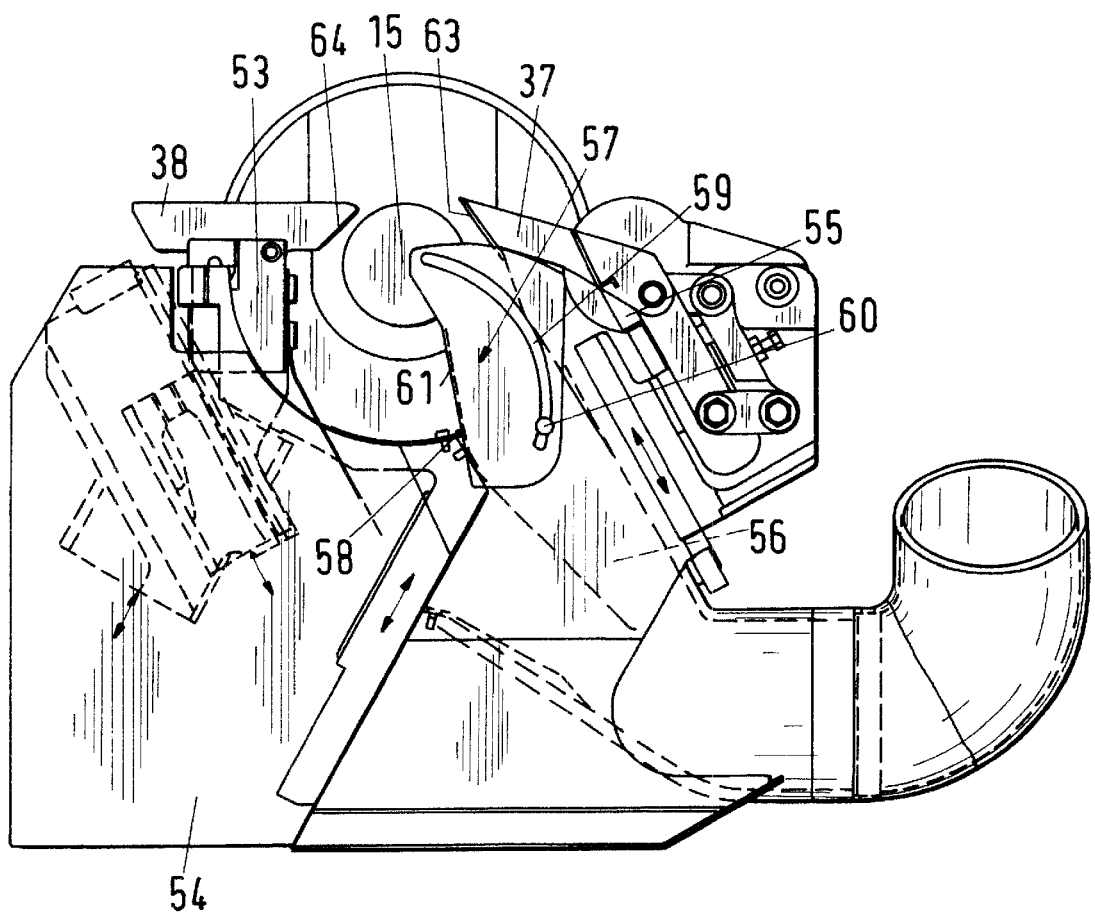
FIG. 7 shows the left spindle according to FIG. 6, on which a tool with a small diameter is seated.

FIG. 7 shows the situation in which on the spindle 15 a tool with a small outer cutting circle diameter is positioned. This tool has also blades with straight cutting edges. The pressing elements 37, 38 are matched to the new outer cutting circle diameter by corresponding adjustments. Moreover, the adjusting element 58 is pivoted counterclockwise about the axis 58. The end face 61 is then no longer approximately tangentially positioned relative to the outer cutting circle diameter, as was the case in the position according to FIG. 6, but approximately radially. Otherwise, the carriers 53 to 55 have been moved for adjusting the pressing elements 37, 38 in the same way as has been explained in connection with the pressing elements 20, 21.

As a result of the adjustment of the adjusting element 57 it is ensured that the inlet opening 65 is positioned close to the circumference of the tool. By doing so, the cuttings which are produced by machining the workpiece 3 are reliably sucked into the suction channel 56. The pressing elements 37, 38 are positioned with their end faces 63, 64 so as to be adjacent to the outer cutting diameter of the tool.

Figure 8:
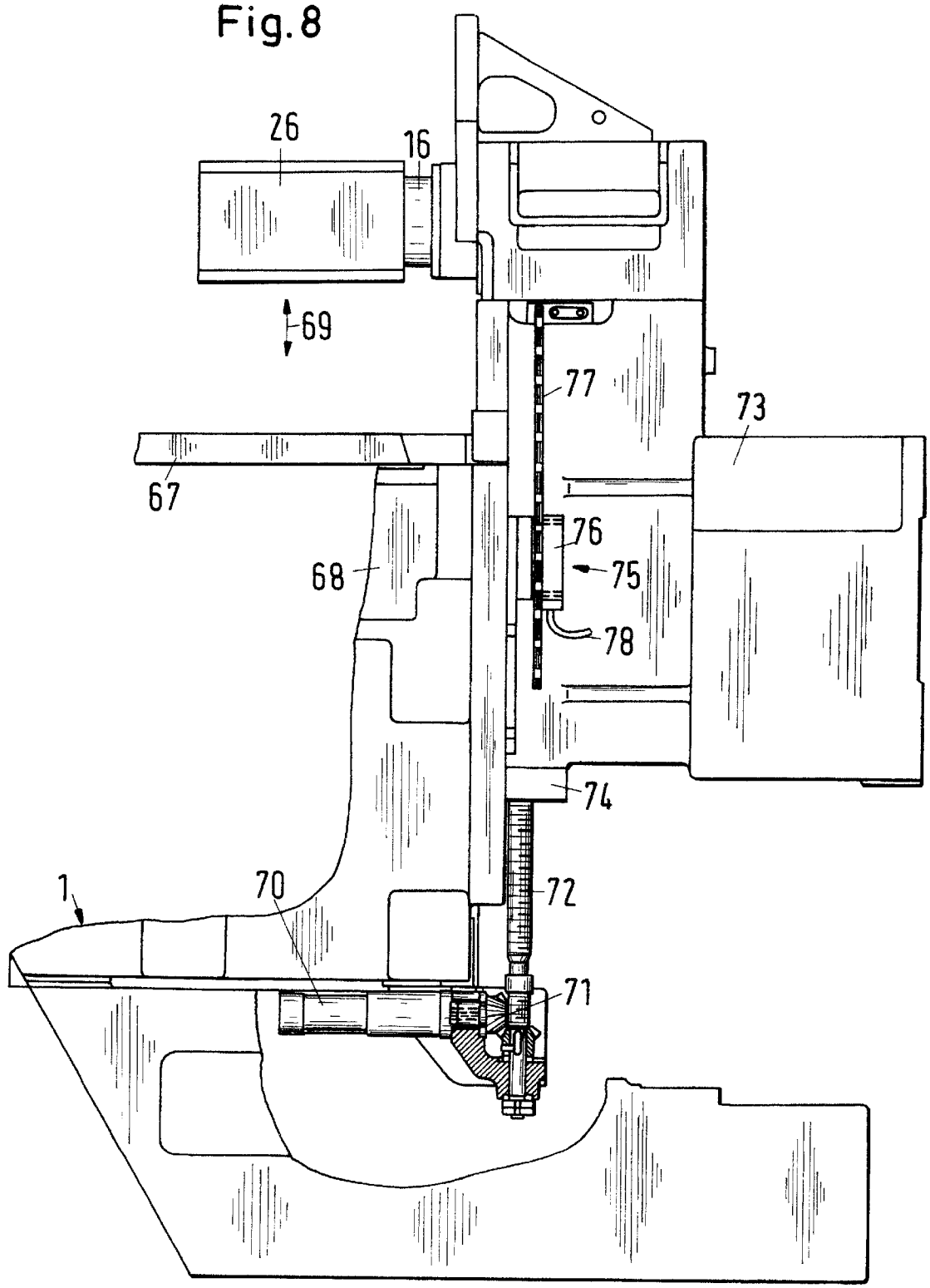
FIG. 8 shows an axial control for the upper spindle of the machine according to the invention.

FIG. 8 shows the axial control with the aid of the example of the upper spindle 16 of the machine. The tool 26 with which the upper side of the workpiece can be machined is seated on the spindle 16. The workpiece 26 or the spindle 16 is positioned at a spacing above a machine table 67 of the machine. It is provided on a machine frame 68 which is part of the machine bed 1. For adjustment to different workpieces of different thickness, respectively, to different outer cutting circle diameters of the tool, the spindle 16 must be adjusted in the radial direction 69 relative to the machine table 67. For this purpose, in the machine bed a positioning motor 70 is provided which drives by means of the gear box 71, preferably a bevel gear pair, a vertically arranged spindle 72. The spindle 72 is preferably a trapezoidally threaded spindle. On the spindle 72, a spindle slide 73 carrying the spindle 16 is supported by means of a nut 74, preferably having a trapezoidal thread. By rotating the spindle 72, the spindle slide 73 is adjusted by means of the nut 74 in the vertical direction 69 in order to adjust the spindle 16 in the desired position.

In order to be able to reliably adjust and/or read the displacement travel of the spindle slide 73 and thus of the spindle 16, a travel measuring system 75 is provided. It has a read head 76 fastened on the machine frame 68 and has correlated therewith a graduation 77 provided on the spindle slide 73. The read head 76 is connected by electrical lines 78 to a computer, a monitor or the like. In order to define final positions for the spindle slide 73 limit switches (not illustrated) can be provided.

Figure 9:
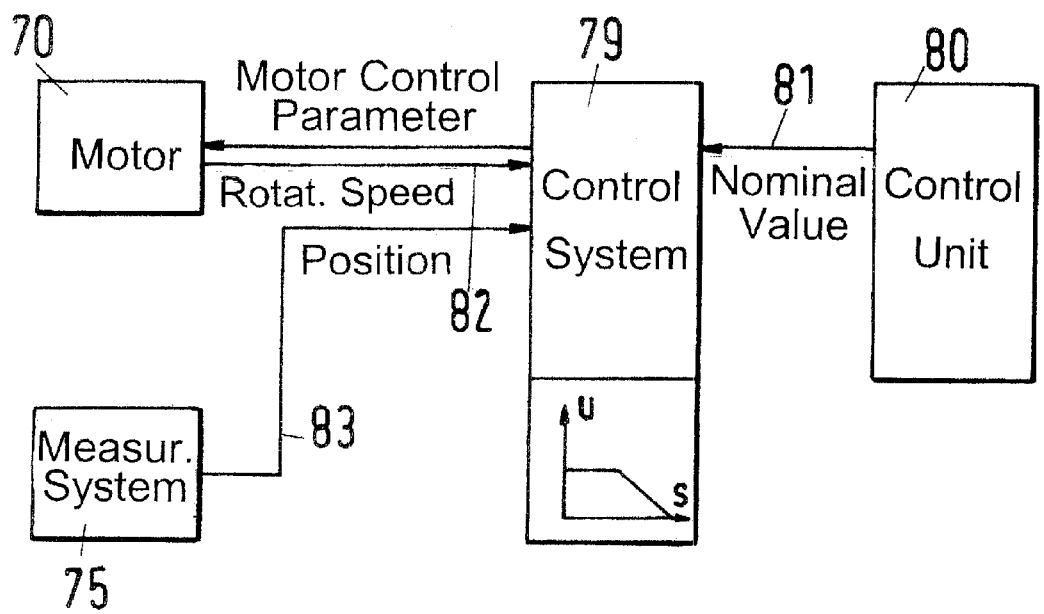
FIG. 9 shows in a schematic illustration the circuit diagram of the axial control.

A control system 79 is positioned upstream of the positioning motor 70 (FIG. 9). The control system 79 receives from a control unit 80 nominal values 81 which can be compared in the control system 79 with actual values 83 provided by the measuring system 75. Moreover, the control system 79 receives from the positioning motor 70 signals 82 which characterize the rotational speed of the positioning motor 70. As soon as the spindle slide 73 and thus the spindle 16 have reached a certain position, which is determined by the measuring system 75, the rotational speed of the motor 70 is reduced. This is illustrated in the rotational speed/travel diagram of FIG. 9. It is shown here that the motor 70 first adjusts at a high rotational speed the spindle slide 73 up to a certain position. As soon as this position has been reached, the rotational speed of the motor 70 is lowered, wherein the spindle slide 73 and spindle 16 can be moved position-controlled via the measuring system 75 into the desired position. In the control system 79 the comparison of the nominal values 81 provided by the control unit 80 and of the actual values 82 and 83 provided by the motor 70 and the measuring system 75 is carried out. As a result of the described position-controlled movement of the spindle 16, a high positioning precision is achieved. As soon as the spindle 16 has reached its desired position, the position control is switched off.

In conventional machines the adjustment or retooling with regard to other workpieces is time-consuming and complicated. In particular, at least one workpiece must be transported through the machine in a preliminary run in order to compare the produced profile with the nominal profile and to perform readjustments should deviations occur. In the described machine the tool data are measured external to the machine and are stored in a data storage of the control unit in the form of data values. The tool data are the radial dimensions as well the axial dimension of the tool. FIG. 10 shows the tool 26 whose profiled blades 27 have the blade profile 28. As a result of this profile 28, the tool 26 has a minimum radius $R_{min}$ as well as a maximum radius $R_{max}$. The fluting depth (groove depth) of the profiled blade 27 is defined by $R_{max}-R_{min}$. Moreover, the axial dimension A of the tool 26 is measured. This tool dimension A is the spacing of a characteristic location of the blade profile 28 from a contact surface 84 of the tool 26 on the spindle 16. The above-mentioned tool data are measured external to the machine directly on the tool and stored. Moreover, the data storage stores the workpiece data, such as thickness, width, and respective profiled dimensions. Based on these tool and workpiece data stored in the storage device it is possible to adjust the adjustable spindles of the machine in the axial and radial direction, the corresponding pressing elements 20, 21; 37, 38, the pressing guides 41, 42, the tabletops 33, 39', the transport beam 5, the feeding rollers 6, the dressing or planing table 13, and the stop rule 30, without the tool having to be seated in the machine. When subsequently the tool required for machining is placed onto the corresponding spindle with the selected adjustment of the machine, it is possible to immediately perform the desired processing of the workpieces 3. A preliminary or sample run is not required. The retooling time from one workpiece profile to another is accordingly very short; skilled personnel for machine retooling are not required.

Advantageously, the position adjustment is carried out fully automatically. However, for a simpler embodiment of the machine it is also possible to show the operator on a display of the control unit which adjustment of the machine must be performed. The operator can then manually adjust the corresponding adjustable parts of the machine according to the displayed nominal position values. Also, it is advantageously possible to perform the greatest part of the adjustments fully automatically and to perform an adjustment by hand only for a few elements which must be adjusted seldomly. Such an element is, for example, the stop 31.

In the case of the upper spindle 16 and the left spindle 15 the fluting depth of the tool $(R_{max}-R_{min})$ and the radial dimension $(R_{max})$ of the tool are required for adjusting the pressing elements 20, 21 and 37, 38.

In order to adjust the left pressing rules 41, 42 in the adjusting direction 43, 44 (FIG. 2), the smallest outer cutting circle radius $R_{min}$ of the left tool is used as a basis for the adjustment. The pressing guides 41, 42 are adjusted such that their contact surfaces 85, 86 are positioned tangentially to the smallest cutting circle diameter $R_{min}$ of the tool.

When adjusting the machine to the workpiece 3 to be processed, first the pressing elements 20, 21; 37, 38 as well as the pressing guides 41, 42 are adjusted to the required position in the manner described. Subsequently, the respective tool, together with the adjustable elements adjusted as described, is adjusted relative to the workpiece to be machined in the axial and radial direction. Alternatively, the feed rollers 6 and the pressing guides 41, 42 can be directly adjusted relative to the workpiece 3 into their desired or required position. For these adjustments, an adjusting drive is used, respectively, as is illustrated with the aid of FIG. 8 for the upper spindle 16.

All adjustments are carried out via a control unit and via the operating panel of the machine.

For adjusting the spindles it is possible to provide, for example, CNC axles whose control is however complex and expensive. It is also known to drive a spindle by means of a motor on whose shaft a shaft encoder for position measuring is positioned. The rotational movement of the spindle is transformed by means of a trapezoidal thread into a linear movement of the spindle. Such axles are constructively simple and inexpensive but do not allow a high positional precision because of the play as well as wear and manufacturing tolerances of these axles. Should a high positional precision not be required, for example, in the adjustment of planing or dressing tables 13 or of the stop 30 or transport beam 5, such simple axles can be used in the described machine. For a high positional precision in the machine described here, the spindle 72 (FIG. 8) is directly driven or driven by means of a gearbox 71 by the motor 70. The adjusting stroke of the spindle slide 73 is measured directly on the spindle slide 73 by means of the measuring system 75. The adjusting travel is supplied as an actual signal 83 to the control system 79 (FIG. 9). The control system 79 compares the actual value with the nominal value 81 provided by the control unit 80 and controls accordingly the motor 70 so that the spindle slide 73 and thus the spindle can be moved exactly into the nominal position. In this connection, it is unimportant whether the transmission chain from the motor 70 to the spindle slide 73 has elements with play because the measuring system 75 directly measures the adjusting stroke of the spindle slide 73. For measuring the adjusting stroke a linear graduation (rule) can be used which has the required high measuring precision for the required application, respectively. The measuring system 75 can be in the form of any suitable linear measuring system.

With the aid of FIGS. 8 and 9, the adjustment of the upper spindle 16 has been explained. The other elements of the machine to be adjusted with high precision are adjusted also in the same way, in particular, the spindles and the pressing elements.

A further important feature of the machine is that the feeding rollers 6 have a width which is matched to the maximum possible width dimension of the workpieces 3 to be machined in the machine. Depending on the width of the workpiece 3 guided through the machine, the shafts 7 supporting the feeding rollers 6 are adjusted axially such that the feeding rollers 6 rest with optimal width on the workpiece 3. FIG. 2 shows the situation in which a very wide workpiece 3 is transported through the machine. The shafts 7 of the feeding rollers 6 are adjusted such that the feeding rollers 6 rest with their entire width on the workpiece 3.

When narrow workpieces 3 are to be transported through the machine (FIG. 3), the feeding rollers 6 or their shafts 7 can be returned in the axial direction 45 so that the feeding rollers 6 rest only over a portion of their width on the workpiece 3. In FIG. 3 this is illustrated for the feeding rollers 6 positioned opposite the left spindle 15. Since the feeding rollers 6 must not be positioned highly precisely, a conventionally controlled axle suffices for their adjustment. The feeding rollers 6 are adjusted axially to such an extent that they will not collide with the neighboring tool on the left spindle 15. The adjusting value depends in this connection on the greatest cutting circle radius $R_{max}$ of the tool 26. Since for narrow workpieces the left spindle 15 is adjusted transversely to the feeding direction of the workpieces 3, a corresponding axial movement of the oppositely positioned feeding rollers 6 is required. The feeding rollers 6 correlated with the planing spindle (dressing spindle) 12 must not be axially adjusted but can remain in their position.

As a result of the axial movement of at least some of the feeding rollers 6, an exchange of feeding rollers is not required as would be the case in conventional machines: depending on the width of the workpieces to be machined, different feeding rollers of different widths are positioned on the shafts in conventional machines. Since machines as described have a large number of feeding rollers, the retooling requires a considerable amount of time. It is also known to adjust the feeding rollers axially by hand. However, the manual adjustment is time-consuming and entails the risk that upon positioning of the left spindle a collision with erroneously adjusted feeding rollers can occur. In the described machine, the corresponding feeding rollers can be quickly axially adjusted so that retooling of the machine is possible within a shortest amount of time with high precision. The corresponding feeding rollers 6 or their shafts 7 are adjusted by the control unit 80 when corresponding workpieces are to be machined. This ensures that no collision will occur between the feeding rollers 6 and the tool.

When axially adjusting the feeding rollers 6, the largest cutting circle radius $R_{max}$ of the tool and the width of the workpiece 3 to be machined are to be taken into account.

While specific embodiments of the invention have been shown and described in detail to illustrate the inventive principles, it will be understood that the invention may be embodied otherwise without departing from such principles.

What is claimed is:

1. A machine for machining workpieces of wood and plastic, said machine comprising:

a transport path configured to transport workpieces (3) through said machine;

one or more driven spindles (12,14–17) having a tool (26) configured to machine the workpieces (3) transported through said machine;

an adjustable element (13; 20, 21; 31; 33, 39'; 37, 38; 41, 42) configured to be adjustable relative to said tool (26);

at least one data storage device configured to store data ($R_{max}$; $R_{min}$; A) at least of said tool (26), wherein said data are used to determine a position of said adjustable element (13; 20,21; 31; 33, 39'; 37, 38; 41,42) relative to said tool (26) and configured to retrieve said data ($R_{max}$; $R_{min}$; A) for positioning said adjustable element (13; 20, 21; 31; 33, 39'; 37, 38; 41,42).

2. The machine according to claim 1, wherein said data ($R_{min}$) stored in said data storage device is the smallest cutting radius of said tool (26).

3. The machine according to claim 1, wherein said data ($R_{min}$) stored in said data storage device is the largest cutting radius of said tool (26).

4. The machine according to claim 1, wherein said data ($R_{max}-R_{min}$) is a fluting depth of said tool (26).

5. The machine according to claim 1, wherein said data (A) is an axial length of said tool (26).

6. The machine according to claim 1, wherein said adjustable element is in the form of table tops (33, 39') of said machine and said tabletops (33, 39') are configured to be adjustable transversely to a feeding direction of said tool (26).

7. The machine according to claim 1, wherein said adjustable element is in the form of pressing elements (20, 21; 37, 38) located in a feeding direction of said tool (26) upstream and downstream of said tool (26).

8. The machine according to claim 1, wherein said adjustable element is in the form of pressing rules (41, 42) configured to be adjustable transversely to a feeding direction of the workpieces (3).

9. The machine according to claim 1, wherein said adjustable element is a stop (31) configured to be adjustable in a feeding direction of the workpieces (3).

10. The machine according to claim 1, comprising a control unit (80) configured to automatically position said adjustable element (13; 21, 21; 31; 33, 39'; 37, 38; 41, 42).

11. The machine according to claim 1, comprising an adjusting drive configured to adjust said driven spindle (12,14–17), wherein said adjusting drive has an adjusting spindle (72) and a drive motor (70) configured to drive said adjusting spindle (72).

12. The machine according to claim 11, wherein said drive motor (70) has a motor shaft and a gear box (71) connected to said motor shaft, wherein said adjusting spindle (72) is connected to said gear box (71).

13. The machine according to claim 11, wherein said adjusting spindle (72) has a trapezoidal thread and wherein said gear box (72) is a bevel gear pair.

14. The machine according to claim 11, wherein said adjusting spindle (72) is supported on said machine.

15. The machine according to claim 11, further comprising a carrier (73) mounted on said adjusting spindle (72), wherein said carrier (73) is configured to receive said driven spindle (12, 14–17).

16. The machine according to claim 15, wherein said adjusting spindle (72) has a spindle nut (74) and wherein said carrier (73) is connected to said spindle nut (74) and seated via said spindle nut (74) on said adjusting spindle (73).

17. The machine according to claim 1, comprising an adjusting drive configured to adjust said adjusting element, wherein said adjusting element is in the form of pressing elements (20, 21; 37, 38), wherein said adjusting drive has an adjusting spindle (72) and a drive motor (70) configured to directly drive said adjusting spindle (72).

18. The machine according to claim 17, wherein said drive motor (70) has a motor shaft and a gear box (71) connected to said motor shaft, wherein said adjusting spindle (72) is drivingly connected to said gear box (71).

19. The machine according to claim 18, wherein said adjusting spindle (72) has a trapezoidal thread and wherein said gear box (72) is a bevel gear pair.

20. The machine according to claim 17, wherein said adjusting spindle (72) is supported on said machine.

21. The machine according to claim 17, further comprising a carrier (47–49; 53–55) configured to receive one of said pressing elements (20, 21; 37, 38), wherein said carrier (47–49; 53–55) is mounted on said adjusting spindle (72).

22. The machine according to claim 21, wherein said adjusting spindle (72) has a spindle nut (74) and wherein said carrier (47–49; 53–55) is connected to said spindle nut (74) and seated via said spindle nut (74) on said adjusting spindle (73).

23. The machine according to claim 17, further comprising a travel measuring system (75) coupled to said adjusting drive.

24. The machine according to claim 23, wherein said travel measuring system (75) comprises a linear graduation (77) connected to said carrier (47–49; 53–55; 73).

25. The machine according to claim 23, wherein said travel measuring system (75) comprises a read head (75).

26. The machine according to claim 23, further comprising a control system (79) wherein said travel measuring system (75) is connected to said control system (79).

27. The machine according to claim 17, wherein said drive motor (70) is connected to said control system (79).

28. The machine according to claim 27, wherein said control system (79) positions at least one of said adjusting element (13; 20, 21; 31, 33; 39'; 37 38; 41, 42) and said driven spindle (12, 14–17) based on signals emitted by said travel measuring device (75).

29. The machine according to claim 28, wherein said control system (79) is configured to perform a comparison of nominal values supplied by a control unit (80) to actual values provided by said travel measuring device (75) and to control said drive motor (70) based on results of said comparison.

30. The machine according to claim 1, comprising feeding rollers (6) configured to transport the workpieces along said transport path, wherein at least one of said feeding rollers (6) is configured to be axially adjustable transversely to a feeding direction of the workpieces (3).

31. The machine according to claim 30, wherein said at least one feeding roller (6) that is axially adjustable has an axially slidable shaft (7).

32. The machine according to claim 30, wherein said at least one feeding roller (6) that is axially adjustable has a width matched to a maximum width of the workpieces (3) to be processed in said machine.

33. The machine according to claim 1, comprising a suction chamber (46, 52) in which said tool (26) is arranged, wherein said suction chamber (46, 52) has a size adapted to a diameter of said tool (26).

34. The machine according to claim 33, wherein said adjusting element is in the form of pressing elements (20, 21; 37, 38) having carriers (47–49; 53–55) and wherein said suction chamber (46, 52) is limited at least partially by said carriers (47–49; 53–55).

35. The machine according to claim 34, wherein said carriers (47–49; 53–55) are adjustable transversely to an axis of said tool (26).

36. The machine according to claim 35, comprising an adjusting drive configured to adjust said carriers (47–49; 53–55) and further comprising a control unit (80), wherein said adjusting drive is connected to said control unit (80).

37. A method for adjusting a machine according to claim 1, said method comprising the steps of:
measuring characteristic data ($R_{max}$; $R_{min}$; A) of said tool (26);
storing said characteristic data ($R_{max}$; $R_{min}$; A) in said data storage device;
supplying said characteristic data to a control unit (80);
calculating in said control unit (80) positioning data for said adjustable element (13; 20, 231; 31; 33, 39; 37, 38, 41, 42) based on said characteristic data and supplying the positioning data for processing of the workpieces.

38. The method according to claim 37, further comprising the step of automatically positioning said adjustable element (13; 20, 21; 31; 33, 39'; 37, 38; 41, 42) with said control unit (80).

39. The method according to claim 37, further comprising the step of displaying said positioning data.

40. The method according to claim 37, further comprising the step of positioning said adjustable element (13; 20, 21; 37, 38) relative to said tool (26).

41. The method according to claim 37, further comprising, after positioning said adjusting element, the step of adjusting said driven spindle (12, 14–17) with said adjusting element (20, 21; 37, 38) relative to the workpiece (3) to be machined.

42. A method for adjusting a machine according to claim 1, said method comprising the step of storing characteristic data of the workpiece (3) in said data storage device and retrieving said characteristic data for machining the workpiece (3).

43. The method according to claim 42, wherein said characteristic data are the thickness, the width and the axial lengths of sides of the workpiece (3) to be produced.

44. The method according to claim 42, further comprising, after positioning said adjusting element, the step of adjusting said driven spindle (12, 14–17) with said adjusting element (20, 21; 37, 38) relative to the workpiece (3) to be machined by taking into consideration said characteristic data of the workpiece (3) and characteristic data of said tool (26).

45. The machine according to claim 11, further comprising at least one data storage device configured to store data ($R_{max}$; $R_{min}$; A) at least of said tool (26), wherein said data are used to determine a position of said adjustable element (13; 20, 21; 31; 33, 39'; 37, 38; 41, 42) relative to said tool (26) and configured to retrieve said data ($R_{max}$; $R_{min}$; A) for positioning said adjustable element (13:20,21; 31, 33, 39'; 37, 38; 41, 42).

46. The machine according to claim 17, further comprising at least one data storage device configured to store data ($R_{max}$; $R_{min}$; A) at least of said tool (26), wherein said data are used to determine a position of said adjustable element (13; 20, 21; 31; 33, 39'; 37, 38; 41, 42) relative to said tool (26) and configured to retrieve said data ($R_{max}$; $R_{min}$; A) for positioning said adjustable element (13; 20, 21; 31, 33, 39'; 37, 38; 41, 42).

47. The machine according to claim 30, further comprising at least one data storage device configured to store data ($R_{max}$; $R_{min}$; A) at least of said tool (26), wherein said data are used to determine a position of said adjustable element (13; 20, 21; 31; 33, 39'; 37, 38; 41, 42) relative to said tool (26) and configured to retrieve said data ($R_{max}$; $R_{min}$; A) for positioning said adjustable element (13; 20, 21; 31, 33, 39'; 37, 38; 41, 42).

48. The machine according to claim 33, further comprising at least one data storage device configured to store data ($R_{max}$; $R_{min}$; A) at least of said tool (26), wherein said data are used to determine a position of said adjustable element (13; 20, 21; 31; 33, 39'; 37, 38; 41, 42) relative to said tool (26) and configured to retrieve said data ($R_{max}$; $R_{min}$; A) for positioning said adjustable element (13; 20, 21; 31, 33, 39'; 37, 38; 41, 42).

* * * * *